T. R. COOK.
TERMINAL STRUCTURE FOR ELECTRIC BATTERIES.
APPLICATION FILED FEB. 18, 1920. RENEWED JULY 22, 1921.

1,411,988.

Patented Apr. 4, 1922.

Thomas R. Cook,
INVENTOR,
BY A. L. Vencill
HIS ATTORNEY.

UNITED STATES PATENT OFFICE.

THOMAS R. COOK, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

TERMINAL STRUCTURE FOR ELECTRIC BATTERIES.

1,411,988.      Specification of Letters Patent.      Patented Apr. 4, 1922.

Application filed February 18, 1920, Serial No. 359,673. Renewed July 22, 1921. Serial No. 486,856.

*To all whom it may concern:*

Be it known that I, THOMAS R. COOK, a citizen of the United States, residing at Pittsburgh, in the county of Allegheny and State of Pennsylvania, have invented certain new and useful Improvements in Terminal Structures for Electric Batteries, of which the following is a specification.

My invention relates to electric batteries, and particularly to terminal structures for such batteries. The invention is particularly well adapted for, though not limited to, batteries of the secondary or storage type.

One object of my invention is the provision of a terminal structure which is effective to prevent leakage of the liquid contained in the battery, which comprises the minimum number of parts, and which can readily be dissembled to permit renewal of the packing without destroying or damaging any of the parts.

I will describe two forms of terminal structure embodying my invention, and will then point out the novel features thereof in claims.

Figure 1:
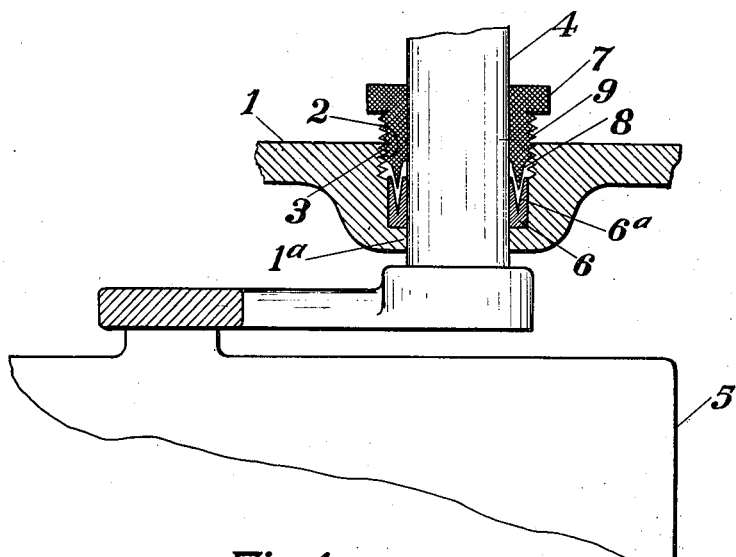
Figure 2:
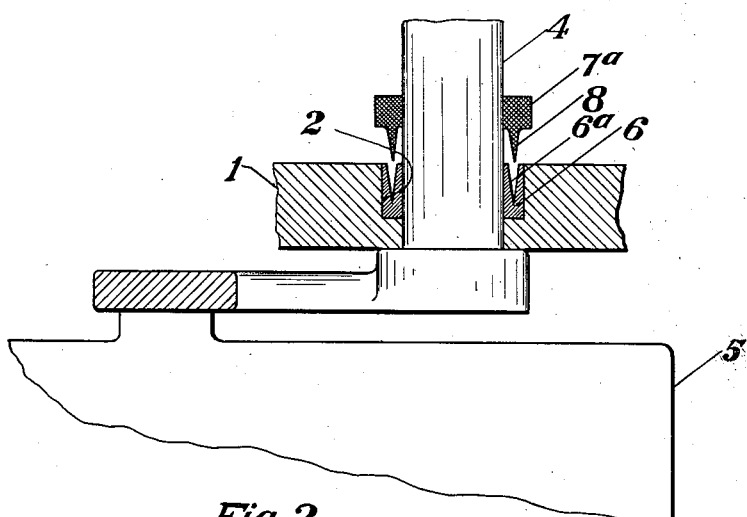

In the accompanying drawings, Fig. 1 is a view showing in vertical section one form of terminal structure embodying my invention, and Fig. 2 is a view similar to Fig. 1 but showing a modified structure also embodying my invention.

Similar reference characters refer to similar parts in both of the views.

Referring first to Fig. 1, the reference character 1 designates the top plate or cover of a battery cell which cover is provided with a round hole 2. The upper part of this hole is screw threaded at 3, and the lower part of the hole is provided with an inwardly extending flange $1^a$ which is spaced from the lower end of the threads 3. Projecting through the hole 2 is a terminal post 4 the lower end of which is attached in a suitable manner to one of the sets of battery plates 5.

Surrounding the post 4 is a sleeve-like gasket 6 of suitable material such as soft rubber, which gasket rests on the flange $1^a$ and extends upwardly to the lower end of the screw threads 3. The upper end of this gasket is provided with a V-shaped recess $6^a$ which extends all the way around the gasket, and which also extends well down into the gasket.

The reference character 7 designates a gland follower which is sleeved over the terminal post 4 and which, as here shown, is in the form of a nut provided with screw threads 9 adapted to coact with the threads 3 in hole 2. The lower end of this nut is provided with a wedge-shaped projection 8 which extends all the way around the nut and which is adapted to enter the recess $6^a$ in the gasket.

To assemble the structure, the gasket 6 is first placed in position on the post 4, and the nut 7 is then screwed down so that the wedge 8 enters the recess $6^a$. The result of this action is to force the inside of gasket 6 into engagement with the post, and the outside into engagement with the wall of hole 2.

When it becomes necessary to renew the packing, the nut 7 is withdrawn, gasket 6 is replaced by a new gasket, and nut 7 is replaced. It will be observed that during this procedure no part of the structure is destroyed or damaged in any way.

Referring now to Fig. 2, the structure shown herein is substantially the same as that shown in Fig. 1 except that the follower, which is here designated $7^a$, is made for a driving fit on the post 4, this post being slightly tapered for the purpose if necessary. The procedure to assemble the structure shown in Fig. 2 is substantially the same as the procedure in connection with Fig. 1, the only difference being that the follower $7^a$ is driven into place by a force applied by suitable means in the line of longitudinal movement of the follower, instead of by turning the follower as in Fig. 1.

In both of the illustrated forms of my invention it will be observed that the walls of the recess $6^a$ form very acute angles with the vertical, that is, with the line of longitudinal movement of the follower, and that the sides of the projection 8 form substantially these same angles with the vertical. It follows that a comparatively great longitudinal movement of the follower causes a comparatively small variation in the pressure of the gasket against the post and cell cover, so that this pressure can be accurately varied. It also follows that this pressure may be made comparatively great, if desired, by a comparatively small amount of force applied to the follower in the direction of its longitudinal movement.

One important feature of my invention is the effective sealing of the terminal structure by only one gasket, thus reducing the number of parts to the minimum.

Although I have herein shown and described only two forms of terminal structure embodying my invention, it is understood that various changes and modifications may be made therein within the scope of the appended claims without departing from the spirit and scope of my invention.

Having thus described my invention, what I claim is:

1. In an electric battery, a cell cover provided with a hole having an inwardly projecting flange, a terminal post passing through said hole, a gasket surrounding said post and resting on said flange, said gasket having a circular recess in its upper end, and a follower sleeved on said post and having a circular projection on its lower end adapted to enter the recess in said gasket.

2. In an electric battery, a cell cover provided with a hole, a terminal post projecting through said hole, a gasket surrounding said post and having a recess in its upper end, and a follower sleeved on said post and having a circular projection on its lower end adapted to enter the recess in said gasket to spread the gasket against the post and the wall of said hole.

3. In an electric battery, a cell cover provided with a hole, a terminal post projecting through said hole, a gasket surrounding said post and having a circular V-shaped recess in its upper end, means for limiting the downward movement of said gasket, and a follower sleeved on said post and having a circular wedge-shaped projection on its lower end adapted to enter the recess in said gasket to spread the gasket against the post and the wall of said hole.

4. In an electric battery, a cell cover provided with a hole, a terminal post projecting through said hole, a gasket surrounding said post and having a recess in its upper end, a follower sleeved on said post and having a circular projection on its lower end adapted to enter the recess in said gasket to spread the gasket against the post and the wall of said hole, and means for driving said follower downwardly in said hole.

5. In an electric battery, a cell cover provided with a hole, a terminal post projecting through said hole, a gasket surrounding said post and having a circular V-shaped recess in its upper end, and a follower sleeved on said post and having a circular wedge-shaped projection on its lower end adapted to enter the recess in said gasket to spread the gasket against the post and the wall of said hole, means for driving said follower downwardly in said hole, and means for limiting the downward movement of said gasket.

6. In an electric battery, a cell cover provided with a hole having screw threads adjacent its upper end and an inwardly projecting flange spaced from the lower end of said threads, a terminal post passing through said hole, a gasket surrounding said post and resting on said flange, said gasket having a circular V-shaped recess in its upper end, and a nut sleeved on said post and provided with threads co-operating with the threads in said hole, said nut having a circular wedge-shaped projection on its lower end adapted to enter the recess in said gasket to spread the gasket against the post and the wall of said hole.

7. In an electric battery, a cell cover provided with a hole, a terminal post projecting through said hole, a gasket surrounding said post and having a circular V-shaped recess in its upper end, and a follower sleeved on said post and constructed for a driving fit thereon, said follower having a circular wedge-shaped projection on its lower end adapted to enter the recess in said gasket to spread the gasket against the terminal post and the wall of said hole.

8. In an electric battery, a cell cover provided with a hole, a terminal post projecting through said hole, a gasket surrounding said post and having a circular V-shaped recess in its upper end, the walls of said recess forming acute angles with the vertical, and a follower sleeved on said post and having a circular wedge-shaped projection on its lower end adapted to enter the recess in said washer, the sides of said projection forming substantially the same angles with the vertical as the walls of said recess.

9. In an electric battery, a cell cover provided with a hole, a terminal post projecting through said hole, a follower sleeved on said post, the lower end of said follower constituting a circular wedge-like projection the sides of which form acute angles with the vertical, and a gasket surrounding said post and having in its upper end a circular recess adapted to receive the projection on said follower.

10. In an electric battery, a cell cover provided with a hole having an inwardly projecting flange, a plate terminal projecting through said hole, a follower sleeved on said post and the lower end of said follower constituting a circular wedge-like projection the sides of which form acute angles with the vertical, and a gasket surrounding said post and resting on said flange and having in its upper end a circular recess adapted to receive said wedge-like projection on the follower.

11. An electric battery comprising a cell cover provided with a hole, a terminal post projecting through said hole, a gasket on said post, and means supported solely by said post for spreading said gasket against the post and the wall of said hole.

12. An electric battery comprising a cell cover provided with a hole, a terminal post projecting through said hole, a follower located at least in part between said post and said cover, and resilient sealing means between said follower and said cover and between said follower and said post.

13. An electric battery comprising a cell cover provided with a hole, a terminal post projecting through said hole, a follower in contact with said post and out of contact with said cover, and resilient sealing means between said follower and said cover and between said follower and said post.

14. An electric battery comprising a cell cover provided with a hole, a terminal post projecting through said hole, a circular wedge-shaped follower located at least in part between said post and said cover, and resilient sealing means between said follower and said cover and between said follower and said post.

15. An electric battery comprising a cell cover provided with a hole, a terminal post projecting through said hole, a follower located at least in part between said post and said cover, and a resilient ring-shaped gasket having an annular recess and located between said follower and said post and between said follower and said cover.

16. An electric battery comprising a cell cover provided with a hole, a terminal post projecting through the hole, a follower located in part between said post and cover, and resilient sealing means adjacent the post and cover, said means being provided with an opening into which the follower extends, whereby one portion of the sealing means is laterally pressed against the post, and another portion thereof is similarly pressed against the cover.

17. An electric battery comprising a cell cover provided with a hole, a terminal post projecting through said hole, a follower in contact with said post but out of contact with said cover, and resilient sealing means adjacent the post and cover, said means being provided with an opening into which the follower extends, whereby one portion of the sealing means is laterally pressed against the post, and another portion thereof is similarly pressed against the cover.

In testimony whereof I affix my signature.

THOMAS R. COOK.